US012668710B2

(12) United States Patent
Bethouart et al.

(10) Patent No.: US 12,668,710 B2
(45) **Date of Patent: \*Jun. 30, 2026**

(54) PEELABLE INK COMPOSITION WITH COLOR-CHANGING FOR POROUS SUBSTRATES

(71) Applicant: SOCIÉTÉ BIC, Clichy (FR)

(72) Inventors: Carine Bethouart, Clichy (FR); Aurore Sauvage, Clichy (FR)

(73) Assignee: SOCIÉTÉ BIC, Clichy Cedex (FR)

( \* ) Notice: Subject to any disclaimer, the term of this patent is extended or adjusted under 35 U.S.C. 154(b) by 801 days.

This patent is subject to a terminal disclaimer.

(21) Appl. No.: 17/995,080

(22) PCT Filed: Mar. 26, 2021

(86) PCT No.: PCT/EP2021/057931
§ 371 (c)(1),
(2) Date: Sep. 29, 2022

(87) PCT Pub. No.: WO2021/198068
PCT Pub. Date: Oct. 7, 2021

(65) Prior Publication Data
US 2023/0203332 A1      Jun. 29, 2023

(30) Foreign Application Priority Data
Mar. 31, 2020      (EP) ..................................... 20167374

(51) Int. Cl.
*C09D 11/50*      (2014.01)
*C09D 11/17*      (2014.01)

(52) U.S. Cl.
CPC .............. *C09D 11/50* (2013.01); *C09D 11/17* (2013.01)

(58) Field of Classification Search
CPC .......... C09D 11/50; C09D 11/17; C09D 11/16
See application file for complete search history.

(56) References Cited

U.S. PATENT DOCUMENTS

| | | | | |
|---|---|---|---|---|
| 4,357,431 A | * | 11/1982 | Murakami ............. | C09D 11/18 106/31.62 |
| 5,959,000 A | * | 9/1999 | Ogiwara ................ | C09D 11/16 524/836 |
| 6,458,192 B1 | * | 10/2002 | Tsujio .................... | C09D 11/18 106/31.86 |
| 2003/0024434 A1 | * | 2/2003 | Butler .................... | C07C 51/21 106/31.86 |
| 2011/0227992 A1 | * | 9/2011 | Matsumoto ............ | C09D 11/40 522/83 |
| 2012/0097903 A1 | * | 4/2012 | Scheffer .................. | C09D 7/63 252/511 |
| 2018/0010005 A1 | * | 1/2018 | Hibino ........................ | B41J 2/01 |
| 2020/0255680 A1 | * | 8/2020 | Kwan .................. | C08K 5/0041 |

FOREIGN PATENT DOCUMENTS

| | | | |
|---|---|---|---|
| EP | 0556668 A1 | | 8/1993 |
| EP | 0556668 B1 | | 11/1995 |
| EP | 0617718 B1 | | 6/1999 |
| EP | 2977416 B1 | | 7/2016 |
| JP | 3027484 B | | 4/2000 |
| JP | 2002265843 A | | 9/2002 |
| JP | 2004143213 A | | 5/2004 |
| JP | 2008265324 A | * | 11/2008 |
| JP | 2019073690 A | * | 5/2019 |

OTHER PUBLICATIONS

English machine translation of JP-2008265324-A (Year: 2008).\*
English machine translation of JP-2019073690-A (Year: 2019).\*
International Search Report issued in International Application No. PCT/EP2021/057931 on Jun. 7, 2021 (3 pages).

\* cited by examiner

*Primary Examiner* — Amber R Orlando
*Assistant Examiner* — Jeffrey Eugene Barzach
(74) *Attorney, Agent, or Firm* — Bookoff McAndrews, PLLC

(57)      ABSTRACT

An aqueous peelable ink composition with color-changing comprises: at least one film-forming elastomeric polymer, at least one polyoxyethylene sorbitan ester, at least one dye, at least one pigment, and water, wherein the film-forming elastomeric polymer (a) is acrylonitrile butadiene rubber (NBR) and/or hydrogenated acrylonitrile butadiene rubber (HNBR).

20 Claims, No Drawings

PEELABLE INK COMPOSITION WITH COLOR-CHANGING FOR POROUS SUBSTRATES

CROSS REFERENCE TO RELATED APPLICATION

This application is a National Stage Application of International Application No. PCT/EP2021/057931, filed on Mar. 26, 2021, now published as WO 2021/198068 A1, which claims priority to European Application No. EP20167374.6, filed on Mar. 31, 2020.

TECHNICAL FIELD

The present disclosure concerns an aqueous peelable ink composition with color-changing, more specifically a writing ink composition with color-changing, in particular for porous substrates. The disclosure also concerns a method for preparing such an aqueous peelable ink composition. A writing instrument comprising such an aqueous peelable ink composition and a method for writing on a porous substrate are also part of the disclosure. Finally, the disclosure concerns a porous substrate coated with an aqueous peelable ink composition according to the disclosure. The aqueous peelable ink composition of the disclosure includes a film-forming elastomeric polymer, at least one polyoxyethylene sorbitan ester, as well as dye and pigment dispersed in water. When the ink composition is applied to porous substrates, the water evaporates and the polymer provides a coalesced residue on the surface of the substrate. The ink composition is peelable in that the residue can be removed from the surface of the substrate, preferably paper surface, for some period of time after formation without leaving a residue or damaging the substrate. Hence, the initial color (first color) of the ink composition after writing on a substrate can be removed by peeling, and the written mark changes into a second color. Preferably, the first and second colors are different which means that they can be distinguished from each other by the human eye. The ink composition of the disclosure is particularly suitable for use with writing porous substrates (also named porous surfaces) made, basically, of pressed, matted fibers, like paper or cardboard. The aqueous peelable ink composition of the disclosure is also storage-stable, easy to manufacture, and easy to apply.

The ink composition of the disclosure preferably has a low viscosity, preferably a viscosity ranging from 3 to 10 mPa·s, more preferably ranging from 3 to 7 mPa·s, and as a result is particularly suitable for use with standard felt-tip markers that rely on a capillary feed system to draw ink from a reservoir. Thus, the ink composition of the disclosure is suitable for use in felt-pens, highlighters, markers, which typically use colored pigments.

Furthermore, the ink composition of the disclosure can be included in one single writing instrument. This allows having multiple color options within the same color mark, for example when the user takes notes, journal or draws to emphasize information or to make things stand out, which allows the user not to use multiple writing instruments.

BACKGROUND

Color-changing ink compositions capable of changing the color of the ink by an eraser are known in the art such as in JP2002265843A or EP2977416B1. Said color-changing ink compositions contain a water-soluble resin, as well as pigment and dye. However, with this kind of color-changing ink compositions, peelability may be difficult after a long period of time, and is thus sometimes not satisfactory. Furthermore, the peelability of the ink compositions of the prior art requires significantly high pressure to obtain a good color-changing. In addition, the colors obtained with the ink compositions of the prior art are generally not very vivid.

Therefore, there is a need to find a new aqueous erasable ink composition, more specifically a new erasable writing ink composition, enabling to obtain a good deposit which has, in particular, a satisfactory color intensity (vivid), a good color-changing capacity particularly when used on porous substrates, preferably while avoiding an unwanted color return and/or color change or color loss due to a change in temperature.

SUMMARY

The inventors have surprisingly found that the use of a polyoxyethylene sorbitan ester, in combination with acrylonitrile butadiene rubber (NBR) and/or hydrogenated acrylonitrile butadiene rubber (HNBR), in presence of pigment and dye dispersed in water, can lead to a color-changing ink composition resolving the above-mentioned problems. The peelable ink composition of the disclosure also presents the advantage of being peelable with fingers, thus using less waste than with conventional erasers, in particular by applying a low pressure (by the user). Furthermore, the aqueous peelable ink composition of the disclosure also presents the advantage of enabling a change of color.

In addition, the aqueous peelable ink composition of the disclosure enables obtaining vivid colors of written marks once applied, especially on porous substrates, in particular the initial color as well as the second color (after peeling) are vivid.

An additional advantage of the disclosure is the possibility to obtain an aqueous peelable ink composition with color-changing having a good cap-off time. The term "cap-off" designated the ability of the ink composition of the disclosure with color-changing of not drying up in the writing instrument, which means in particular that the writing instrument can be left open for longer period of time, preferably one hour or even several hours, in particular with removed cap, without drying up.

DETAILED DESCRIPTION

Hereinafter, a detailed description of the present disclosure will be given. The specific embodiments are meant better illustrate the present disclosure, however, it should be understood that the present disclosure is not limited to these specific embodiments. In the sense of the present disclosure, the expression "comprising a" should be understood as being synonymous with "comprising at least one".

In the sense of the present disclosure, the expressions "between . . . and . . . " or "ranging from . . . to . . . " should be understood as including the values of the limits.

For the purposes of the present disclosure, the term "erasable ink" or "peelable ink" is intended to mean any ink which can be peeled (or rubbed) after writing, preferably by the use of a finger or a friction body wherein the friction body can be an eraser or a tissue. The written mark obtained, in particular on cellulosic fibers paper such as paper (printer paper for example) and cardboard, by this ink can therefore be peeled just after writing such as less than 10 seconds after writing, even a few days after writing, and also even one month after writing, to change the initial color of the writing in another color (second color).

Hence, once applied, the initial color of the written mark made with the ink composition according to the disclosure, can be changed by peeling of the written mark into a second color.

For the purposes of the present disclosure, the term "porous substrate" is intended to mean substrate that contains pores. The porous substrates have empty spaces or pores that allow external matter, like ink, to penetrate into the substrate.

Advantageously, the roughness of the substrate can be defined by its air permeability and measured by the standard ISO 8791 (unit: mL·min-1). In a preferred embodiment, the air permeability of the porous substrate of the disclosure ranges from 50 to 1,000 mL.min-1, preferably from 60 to 400 mL.min-1, and more preferably from 80 to 280 mL.min-1.

In particular, the porous substrate is chosen among porous substrate comprising cellulosic fibers such as paper, printer paper, or cardboard.

The ink composition according to the present disclosure is advantageously irreversibly peeled. It is therefore an irreversible peelable color-changing ink composition. The term "color-changing ink" is intended to mean that once the color has changed, it is not possible to change it again, and in particular it is not possible to go back to the initial color (first color).

The ink composition according to the present disclosure is more specifically a writing ink. For the purposes of the present disclosure, the term "writing ink" is intended to mean any ink which is intended to be used in a writing instrument, and in particular in a felt-pen, a highlighter, a marker. A writing ink should not be confused with a printing ink which is used in printing machines and which does not have the same technical constraints, and thus the same specifications. Indeed, a writing ink must not contain solid particles of which the size is greater than the channels of the writing instrument, in order to avoid blocking them, which would inevitably lead to writing being irreversibly stopped. It must also dry sufficiently rapidly to avoid smudging the writing medium. It must also avoid the problems of migration (bleeding) over time. Thus, the ink composition according to the present disclosure will be suitable for the writing instrument for which it is intended.

The present disclosure therefore concerns an aqueous peelable ink composition for porous substrates comprising:
(a) at least one film-forming elastomeric polymer,
(b) at least one polyoxyethylene sorbitan ester,
(c) at least one dye,
(d) at least one pigment, and
(e) water,
wherein the film-forming elastomeric polymer (a) is acrylonitrile butadiene rubber (NBR) and/or hydrogenated acrylonitrile butadiene rubber (HNBR), and wherein the polyoxyethylene sorbitan ester (b) is preferably a polyoxyethylene sorbitan fatty acid ester, more preferably a polyoxyethylene sorbitan fatty acid ester with a chain of fatty acid in $C_5$-$C_{25}$, even more preferably a polyoxyethylene sorbitan fatty acid ester with a chain of fatty acid in $C_8$-$C_{16}$, and in particular a polyoxyethylene sorbitan monolaurate.

In the sense of the disclosure, "film-forming" means a polymer capable of forming, by itself a macroscopically continuous film on a substrate, in particular on a porous substrate, and preferably a cohesive film.

In the sense of the disclosure, "elastomeric" means a polymer that displays rubber-like elasticity, i.e. a deformable, flexible polymer which has viscoelastic properties.

In the sense of the disclosure, a "polymer" is a compound (in particular a large molecule or a macromolecule) corresponding to the repetition of one or more units (these units being derived from compounds called monomers), and in particular the repetition of at least two repeating units, and preferably at least ten repeating units.

The film-forming elastomeric polymer (a) allows the fixation of the ink composition of the disclosure on the paper, and therefore avoids the written mark (deposit) of the ink to be peeled (i.e. removed) by simply brushing it with another sheet of paper while being able to change its initial color to another one by peeling with a finger or a friction body. The film-forming elastomeric polymer (a) of the disclosureis acrylonitrile butadiene rubber (NBR), for example commercially available under the name Nipol® LX531B (Zeon Corporation), Europrene® (Versalis), Krynac® (Brenntag), and/or hydrogenated acrylonitrile butadiene rubber (HNBR), for example commercially available under the name Zetpol® 2230LX (Zeon Corporation), Therban® (Brenntag), as well as mixtures of acrylonitrile butadiene rubber (NBR) and hydrogenated acrylonitrile butadiene rubber (HNBR).

The film-forming elastomeric polymer (a) of the disclosure is acrylonitrile butadiene rubber (NBR) and/or hydrogenated acrylonitrile butadiene rubber (HNBR), and preferably hydrogenated acrylonitrile butadiene rubber (HNBR).

Advantageously, the film-forming elastomeric polymer (a) represents at least 8% by weight, preferably at least 12% by weight, more preferably at least 16% by weight, and even more preferably at least 20% by weight, relative to the total weight of the ink composition. In a preferred embodiment, the content of film-forming elastomeric polymer (a) ranges from 8 to 36% by weight, and more preferably from 12 to 32% by weight, relative to the total weight of the ink composition.

The aqueous peelable ink composition of the disclosure also comprises at least one polyoxyethylene sorbitan ester. Advantageously, the polyoxyethylene sorbitan ester is a polyoxyethylene sorbitan fatty acid ester, and more advantageously a polyoxyethylene sorbitan fatty acid ester with a chain of fatty acid in $C_5$-$C_{25}$, more preferably a polyoxyethylene sorbitan fatty acid ester with a chain of fatty acid in $C_8$-$C_{16}$. In a particularly preferred embodiment, the polyoxyethylene sorbitan ester of the disclosure is a polyoxyethylene sorbitan monolaurate. The polyoxyethylene sorbitan ester comprises repeating units of ethylene oxide, preferably at least 20 repeating units of ethylene oxide. In a particularly preferred embodiment, the polyoxyethylene sorbitan monolaurate has a weight average molecular weight Mw ranging from 800 to 2,000 g·mol-1, more advantageously from 1,000 to 1,500 g·mol-1, and even more advantageously of 1,300 g·mol-1, measured by Gel Permeation Chromatography (GPC).

Advantageously, the content of polyoxyethylene sorbitan ester (b) in the aqueous peelable ink composition of the disclosure ranges from 0.1 to 5% by weight, more advantageously from 0.1 to 3% by weight, and even more advantageously from 0.2 to 3% by weight, relative to the total weight of the ink composition.

The aqueous peelable ink composition of the disclosure also comprises at least one dye (c), in particular a mixture of dyes, solubilized in water. The term "dyes" should be understood as meaning colored, mineral or organic particles of any form, which are soluble in the medium in which they are solubilized, and which are intended to color the ink composition once applied on a porous substrate after peeling. Thanks to the presence of a dye in the ink composition of the disclosure, the initial color of the writing can change in another color by peeling with a finger or a friction body. The dye (c) may be chosen in the group consisting of direct dyes (for example C.I direct black 17, 19, 22, 32, 38, 51, 71; C.I direct yellow 4, 26, 44, 50; C.I direct red 1, 4, 23, 31, 37, 39, 75, 80, 81, 83, 225, 226, 227; C.I direct blue 1, 15, 41, 71, 86, 87, 106, 108, 199, and the like), acid dyes (for example C.I acid black 1, 2, 24, 26, 31, 52, 107, 109, 110, 119, 154; C.I acid yellow 1, 7, 17, 19, 23, 25, 29, 38, 42, 49, 61, 72, 78, 110, 127, 135, 141, 142; C.I acid red 8, 9, 14, 18, 26, 27, 33, 35, 37, 51, 52, 57, 82, 83, 87, 92, 94, 111, 129, 131, 138, 186, 249, 254, 265, 276; C.I acid violet 15, 17, 49; C.I acid blue 1, 3, 7, 9, 15, 22, 23, 25, 40, 41, 43, 62, 78, 83, 90, 93, 100, 103, 104, 112, 113, 158; C.I acid green 3, 9, 16, 25, 27; C.I acid orange 56, and the like), food dyes (such as C.I. food yellow 3, and the like), Malachite green (C.I 4200) Victoria blue FB (C.I. 44045) methyl violet FN (C.I. 42535), rhodamine F4G (C.I. 45160), and rhodamine 6GCP (C.I 45160), and mixtures thereof.

The content of the dye(s) (c) may range from 0.1 to 10% by weight, advantageously from 0.2 to 8% by weight, and more advantageously from 0.3 to 5% by weight, by weight relative to the total weight of the ink composition.

The aqueous peelable ink composition of the present disclosure also comprises at least one pigment (d) which gives the color to the ink composition. The term "pigment" should be understood as meaning white or colored, mineral or organic particles of any form, which are insoluble in the medium in which they are solubilized, and which are intended to color the ink composition once applied on a porous substrate before peeling. The pigments (d) are also generally contained in a dispersion, where the grinding down or particle size reduction is accompanied by appropriate dispersants to achieve stable dispersions. The pigment (d) is preferably a pigment dispersion, more preferably chosen in the group consisting of pigment black 7 (such as Flexiverse III black 7 by SunChemical®), pigment blue 15:3 (such as APE FRE BL 15:3 DISP by SunChemical®), pigment red (such as Pigment red 210 by SunChemical®), pigment green 7 (such as Sunsperse Eco green, Flexiverse FD Green, Flexiverse Green 7, Flexiverse HC GRN 7 by SunChemical®), and mixtures thereof. In a preferred embodiment, the pigment (b) is chosen in the group consisting of pigment black 7 (such as Flexiverse III black 7 by SunChemical®), pigment blue 15:3 (such as APE FRE BL 15:3 DISP by SunChemical®), and mixtures thereof.

According to a preferred embodiment, the diameter of the pigment in a pigment dispersion is less than 1 μm, and preferably less than 0.7 μm.

Advantageously, the content of pigment dispersion (d) ranges from 0.1 to 10% by weight, and preferably from 0.5 to 7% by weight, relative to the total weight of the ink composition.

Advantageously, the content of pigment (d) ranges from 30 to 50% by weight, preferably from 35 to 45% by weight, and more preferably from 38 to 45%, relative to the total weight of the pigment dispersion.

The aqueous peelable ink composition of the disclosure also contains water (e) as the solvent.

Advantageously, the content of water (e) in the aqueous peelable ink composition of the disclosure ranges from 10 to 80% by weight, more advantageously from 10 to 70% by weight, and even more advantageously from 20 to 60% by weight, relative to the total weight of the ink composition.

The aqueous peelable ink composition of the disclosure may further contain at least one plasticizer. The plasticizer of the invention is chosen in the group consisting of alcohols, preferably glycerin, benzoate esters, diisobutyrate esters such as trimethyl pentanyl diisobutyrate, and mixtures thereof, and more preferably glycerin, benzoate esters, and mixtures thereof. According to a preferred embodiment, the aqueous peelable ink composition of the disclosure comprises as plasticizer a mixture of at least one ester and at least one alcohol, wherein the at least one alcohol preferably has a boiling point higher than 160° C., and more preferably is glycerin (boiling point: 290° C.).

Advantageously, the content of plasticizer in the aqueous peelable ink composition of the disclosure ranges from 1 to 25% by weight, and more advantageously from 8 to 20% by weight, relative to the total weight of the ink composition.

The aqueous peelable ink composition according to the present disclosure may further comprise additional additive(s) known by the skilled person to be usable in aqueous ink compositions, advantageously selected in the group consisting of antimicrobial agents, antifungal agents, dispersing agents, wetting agents, pH regulators, and mixtures thereof.

Advantageously, the content of additional additive(s) in the ink composition of the disclosure ranges from 0.1 to 30% by weight, more advantageously from 0.1 to 20% by weight, and even more advantageously from 0.1 to 10% by weight, relative to the total weight of the ink composition.

The aqueous peelable ink composition of the disclosure may advantageously contain at least one antimicrobial agent such as methyl paraben, phenoxyethanol, isothiazolinone, 1,2-benzoisothiazolin-3-one, 2-methyl-4-isothiazolin-3-one, and mixtures thereof.

Advantageously, the antimicrobial agent is present in the aqueous peelable ink composition of the disclosure in a content ranging from 0.1 to 5% by weight, and more advantageously from 0.1 to 2% by weight, relative to the total weight of the ink composition.

The aqueous peelable ink composition according to the present disclosure may also contain a pH regulator, preferably chosen in the group consisting of ammonia, urea, monoethanolamine, diethanolamine, triethanolamine, alkali metal salts of phosphoric acid such as tripolyphosphate, sodium carbonate and hydroxides of alkali metals such as sodium hydroxide.

The ink composition according to the present disclosure is peelable, advantageously by peeling such as by mechanical friction, in particular by the use of a finger or a friction body wherein the friction body is an eraser or a tissue. The ink composition of the disclosure is therefore peelable by the use of the heat generated by the friction of the finger or the eraser.

Advantageously, the eraser used as a friction body may be chosen in the group consisting of ethylene-propylene-diene monomer (EPDM) rubber, Vulcanized Thermoplastic Elastomer (TPV) which is a blend of ethylene-propylene-diene monomer (EPDM) rubber and polypropylene (PP), ethylene-propylene rubber (EPR), poly(styrene-butadiene-styrene) (SBS), styrene ethylene butylene styrene (SEBS), natural rubber (NR), polyisoprene (IR), polyvinyl chloride, styrene-based thermoplastic elastomers including styrene-butadiene-styrene (SBS), styrene-ethylene-butylene-styrene (SEBS), styrene-ethylene-propylene-styrene (SEPS), styrene-ethylene-ethylene-propylene-styrene (SEEPS), polyether based polyurethane (PTU), and mixtures thereof.

Advantageously, the tissue used as a friction body may be chosen in the group consisting of cotton fabric, synthetic fabric and leather fabric, and more advantageously cotton fabric.

The aqueous peelable ink composition according to the present disclosure has advantageously a viscosity of 3 to 10 mPa·s, and more advantageously of 3 to 7 mPa·s, measured at 20° C. with a Shell Cup #1 marketed by NORCROSS® Corporation. When the viscosity is less than 3 mPa·s, the pigment particles may settle more rapidly in the composition with a risk of ink leakage. Furthermore, when the viscosity is higher than 10 mPa·s, the flow rate of the ink composition is too low and any line was not written.

The present disclosure also concerns a method for preparing an aqueous peelable ink composition according to the disclosure, comprising the steps of:

(i) under stirring, adding at least one dye (c) to water (e),
(ii) under stirring, adding at least one film-forming elastomeric polymer (a) to the mixture obtained in step (i),
(iii) under stirring, adding at least one polyoxyethylene sorbitan ester (b), at least one pigment (d), and the optional at least one plasticizer, to the mixture obtained in step (ii), and
(iv) under stirring, adding the optional additives to the mixture obtained in step (iii).

The film-forming elastomeric polymer (a), polyoxyethylene sorbitan ester (b), dye(s) (c), pigment (d), water (e), as well as the optional plasticizer and additive(s), are as defined above for the aqueous peelable ink composition according to the disclosure.

During steps (i), (ii), (iii), and (iv), the ink ingredients are mixed under stirring at room temperature (20° C.), advantageously at a stirring speed ranging from 200 to 700 rpm, and more advantageously at a stirring speed of 500 rpm.

The ink composition obtained in steps (i), (ii), (iii), and (iv), can be homogenized during a certain period of time ranging from 3 to 20 minutes, and preferably from 5 to 10 minutes.

The present disclosure also concerns a writing instrument, in particular a pen such as a felt-pen, a highlighter, a marker, and more advantageously it is a writing felt-pen, a coloring felt-pen, a highlighter, containing an ink composition according to the disclosure.

Advantageously, the writing instrument according to the present disclosure contains an eraser, in particular located on the cap or on the non-writing end of the writing instrument. More particularly, the eraser consists of ethylene-propylene-diene monomer (EPDM) rubber, Vulcanized Thermoplastic Elastomer (TPV) which is a blend of ethylene-propylene-diene monomer (EPDM) rubber and polypropylene (PP), ethylene-propylene rubber (EPR), poly(styrene-butadiene-styrene) (SBS), styrene ethylene butylene styrene (SEBS), natural rubber (NR), polyisoprene (IR), polyvinyl chloride, styrene-based thermoplastic elastomers including styrene-butadiene-styrene (SBS), styrene-ethylene-butylene-styrene (SEBS), styrene-ethylene-propylene-styrene (SEPS), styrene-ethylene-ethylene-propylene-styrene (SEEPS), polyether based polyurethane (PTU), and mixtures thereof.

According to a preferred embodiment, the writing instrument according to the present disclosure comprises:

an axial barrel containing an aqueous peelable ink composition according to the disclosure, and
a pen body which delivers the aqueous peelable ink composition stored in the axial barrel.

Another object of the present disclosure is a method for writing on a porous substrate, comprising the step of applying an ink composition according to the disclosure to a porous substrate, preferably comprising cellulose fibers, and more preferably chosen in the group consisting of paper, printer paper or cardboard. The method for writing on a porous substrate may further comprise the step of changing the initial color (first color) of the writing into another color (second color) by peeling, preferably by peeling the writing with a finger or with a friction body wherein the friction body is an eraser or a tissue, preferably said first and second colors being different from each other.

Finally, another object of the present disclosure is a porous substrate coated with an aqueous peelable ink composition according to the present disclosure, wherein the substrate is preferably chosen in the group consisting of paper, printer paper or cardboard.

In addition to the foregoing, the disclosure also comprises other provisions which will emerge from the additional description which follows, which relates to the preparation of aqueous peelable ink compositions according to the present disclosure and comparative examples.

EXAMPLES

Example 1: Preparation of an Aqueous Peelable Ink Composition According to the Disclosure An aqueous peelable ink composition according to the present disclosure comprising the ink ingredients of Table 1 was prepared.

TABLE 1

| Trade name | Chemical name | % by weight |
|---|---|---|
| Water | | 28.5% |
| Zetpol ® 2230LX | HNBR (dry extract: 40.5%) | 55% (22% of pure HNBR) |
| Benzoflex ™ 2088 | Benzoate ester | 10% |
| PAT ®-662/BNF | Polyoxyethylene sorbitan monolaurate | 0.5% |
| APE FRE BL 15:3 Disp BPD 0015 | Pigment dispersion | 5% |
| Sanolin ® Rhodamine B02 | Acid Red 52 | 0.5% |
| Acticide PHE | Phenoxyethanol | 0.5% |
| Total | | 100% |

For a preparation of 1 kg, 285 g of water were introduced at room temperature in a dissolver DISPERMAT® LC75 (dissolver disc Ø 60 mm), and 5 g of Sanolin® Rhodamine B02 (Clariant) were added under agitation (stirring speed: 500 rpm). Then, 550 g of Zetpol® 2230LX (Zeon Corporation) were added at the same stirring speed. The % of solid HNBR in Zetpol® 2230LX (Zeon Corporation) represents 40.5% (dry extract), and the % of solid HNBR in the final ink composition is thus of 22% by weight. After 5 minutes, 100 g of Benzoflex™ 2088 (EASTMAN) were slowly introduced. After 5 minutes under the same stirring speed, 5 g of PAT®-662/BNF (Würtz) were added. After 5 minutes under the same stirring speed, 50 g of a blue pigmented dispersion APE FRE BL 15:3 Disp BPD 0015 (SunChemical) were added. The mixture was stirred for 5 minutes more. Then, 5 g of Acticide PHE were added, and the mixture was stirred for 5 minutes more to obtain the final ink composition.

The viscosity of the aqueous peelable ink composition was measured at 20° C. with a Shell Cup #1 marketed by NORCROSS® Corporation, according to the following procedure:

1. Dip the Shell Cup in the ink composition until the cup is completely filled with ink composition.
2. Take the Shell Cup out of the fluid and start the timer simultaneously.

3. Stop the timer as soon as the fluid does not flow out any more. The time displayed on timer is reported as the Shell Cup viscosity at 20° C. of the fluid.

4. Clean and dry the Shell Cup.

5. Repeat steps 1 to 5 with the same fluid two times.

6. Report the average viscosity of the three measures.

7. Store the Shell Cup at 20° C.

The viscosity of the aqueous peelable ink composition of example 1 measured according to this procedure was: 6 mPa·s.

Example 2: Preparation of an Aqueous Peelable Ink Composition According to the Disclosure An aqueous peelable ink composition according to the present disclosure comprising the ink ingredients of Table 2 was prepared.

TABLE 2

| Trade name | Chemical name | % by weight |
| --- | --- | --- |
| Water | | 50.5% |
| Nipol ® LX 531B | NBR (dry extract: 66%) | 33% (22% of pure HNBR) |
| Benzoflex ™ 2088 | Benzoate ester | 10% |
| PAT ®-662/BNF | Polyoxyethylene sorbitan monolaurate | 0.5% |
| APE FRE BL 15:3 Disp BPD 0015 | Pigment dispersion | 5% |
| Sanolin ® Rhodamine B02 | Acid Red 52 | 0.5% |
| Acticide PHE | Phenoxyethanol | 0.5% |
| Total | | 100% |

For a preparation of 1 kg, 505 g of water were introduced at room temperature in a dissolver DISPERMAT® LC75 (dissolver disc Ø 60 mm), and 5 g of Sanolin® Rhodamine B02 (Clariant) were added under agitation (stirring speed: 500 rpm). Then, 330 g of Nipol® LX 531B (Zeon Corporation) were added at the same stirring speed. The % of solid NBR in Nipol® LX 531B (Zeon Corporation) represents 66% (dry extract), and the % of solid NBR in the final ink composition is thus of 22% by weight. After 5 minutes, 100 g of Benzoflex™ 2088 (EASTMAN) were slowly introduced. After 5 minutes under the same stirring speed, 5 g of PAT®-662/BNF (Würtz) were added. After 5 minutes under the same stirring speed, 50 g of a blue pigmented dispersion APE FRE BL 15:3 Disp BPD 0015 (SunChemical) were added. The mixture was stirred for 5 minutes more. Then, 5 g of Acticide PHE were added, and the mixture was stirred for 5 minutes more to obtain the final ink composition.

The viscosity of the aqueous peelable ink composition was measured at 20° C. with a Shell Cup #1 marketed by NORCROSS® Corporation, according to the same procedure as described in example 1.

The viscosity of the aqueous peelable ink composition of example 2 measured according to this procedure was: 3.77 mPa·s.

Example 3: Preparation of a Comparative Aqueous Peelable Ink Composition

A comparative aqueous peelable ink composition comprising the ink ingredients of Table 3 was prepared.

TABLE 3

| Trade name | Chemical name | % by weight |
| --- | --- | --- |
| Water | | 28.5% |
| Zetpol ® 2230LX | HNBR (dry extract: 40.5%) | 55% (22% of pure HNBR) |
| Benzoflex ™ 2088 | Benzoate ester | 10% |
| Additol XL 6568 | — | 0.5% |
| APE FRE BL 15:3 Disp BPD 0015 | Pigment dispersion | 5% |
| Sanolin ® Rhodamine B02 | Acid Red 52 | 0.5% |
| Acticide PHE | Phenoxyethanol | 0.5% |
| Total | | 100% |

For a preparation of 1 kg, 285 g of water were introduced at room temperature in a dissolver DISPERMAT® LC75 (dissolver disc Ø 60 mm), and 5 g of Sanolin® Rhodamine B02 (Clariant) were added under agitation (stirring speed: 500 rpm). Then, 550 g of Zetpol® 2230 LX (Zeon corporation) were added at the same stirring speed. The % of solid HNBR in Zetpol® 2230LX (Zeon Corporation) represents 40.5% (dry extract), and the % of solid HNBR in the final ink composition is thus of 22% by weight. After 5 minutes, 100 g of Benzoflex™ 2088 (EASTMAN) were slowly introduced. After 5 minutes under the same stirring speed, 5 g of Additol XL 6568® (Allnex) were added. After 5 minutes under the same stirring speed, 50 g of a blue pigmented dispersion APE FRE BL 15:3 Disp BPD 0015 (SunChemical) were added under the same stirring speed. The mixture was stirred for 5 minutes more. Then, 5 g of Acticide PHE were added, and the mixture was stirred for 5 minutes more to obtain the final ink composition.

The viscosity of the aqueous peelable ink composition was measured at 20° C. with a Shell Cup #1 marketed by NORCROSS® Corporation, according to the same procedure as described in example 1.

The viscosity of the aqueous peelable ink composition of example 3 measured according to this procedure was: 6.3 mPa·s.

Example 4: Writing Performances and Peelability Performances of the Prepared Aqueous Peelable Ink Compositions Writing Performance: Evaluation of Color Intensity The color intensity, i.e. the appearance of the color of a written mark made with an ink composition by applying it on a porous substrate (printed paper: paper A4 REY®, 80 g/m² by Ipaper) was assessed by using the following method at 23° C. and 50% relative humidity, and then evaluated by visual assessment.

The color of the obtained written mark made on the porous substrate is called "color 1" and corresponds to the initial color of the written mark, before being peeled (or rubbed) with an eraser.

The written mark made with the ink composition was then peeled with an eraser, i.e. polyether based polyurethane (PTU), just after writing (around 10 seconds after writing), to change the initial color of the writing mark (here color 1: blue) into a second color (here color 2: pink).

The Method is as Followed:

Loops were drawn with a pen on the porous substrate, and the color intensity of the ink composition assessed after peeling by comparison with a control sample (ink according to example 1 without pigment APE FRE BL 15:3 Disp BPD 0015).

The scoring (color intensity of the written mark before peeling, here color 1: blue) is defined as follows:

10: The color of the ink composition after applying on the porous substrate (and before peeling) is very vivid (dark).

0: The color of the ink composition after applying on the porous substrate (and before peeling) is very light.

The results are indicated in Table 4 below.

Erasability Performance: Measurement of Peelability

The peelability (erasing efficiency of the first color) is the ability of the eraser to peel correctly the written mark of first color applied on a porous substrate (printed paper: paper A4 REY®, 80 g/m², by Ipaper), assessed according to the following method at 23° C. and 50% relative humidity.

The written mark was peeled (or rubbed) with an eraser, i.e. polyether based polyurethane (PTU), just after writing (around 10 seconds after writing), to peel the initial color of the written mark and allow it to change from initial color 1 (here color 1: blue) into a second color 2 (here color 2: pink). Hence, the initial color 1 (here color 1: blue) was removed by peeling with the eraser.

The Method is as Follows:

Loops were drawn with a pen on the porous substrate, and then peeled in one time back and forth.

The scoring (i.e. the peeling efficiency of color 1) is defined as follows:

10: Erasability by peeling of the first color 1 is very efficient (no remaining written mark of the initial color 1).

0: Erasability by peeling of the first color 1 is not efficient (remaining written marks of the initial color 1).

The results are indicated in Table 4 below.

Easiness of the Peelability: Measurement of Pressure

The requested pressure to peel (or to erase) by rubbing the initial color of the written mark applied on a porous substrate (printed paper: paper A4 REY®, 80 g/m² by Ipaper) was assessed by using the following method at 23° C. and 50% relative humidity.

The written mark was peeled (or rubbed) with an eraser, i.e. polyether based polyurethane (PTU), just after writing (around 10 seconds after writing), to change the initial color of the written mark (here color 1: blue) into a second color (here color 2: pink).

The Method is as Follows:

A line of loops was rubbed, from one side to the other with diagonal movements, by increasing progressively the erasing pressure.

The pressure required was assessed in order to get a satisfactory peeling of the initial color.

The scoring (easiness of the peeling of the written mark of color 1) is defined as follows:

10: Light pressure is requested to peel color 1 of the written mark.

0: Strong pressure is requested to peel color 1 of the written mark.

The results are indicated in Table 4 below.

TABLE 4 comparison of the writing performances and erasability (peelability) performances of the ink compositions of the disclosure (examples 1 and 2) with the comparative ink composition (example 3)

| Ink compositions | Color intensity of the initial color before peeling (color 1:blue) | Peeling efficiency of color 1 | Pressure requirement (easiness of the peeling of color 1) |
|---|---|---|---|
| Example 1 (present disclosure) | 5 | 6 | 7 |

TABLE 4-continued comparison of the writing performances and erasability (peelability) performances of the ink compositions of the disclosure (examples 1 and 2) with the comparative ink composition (example 3)

| Ink compositions | Color intensity of the initial color before peeling (color 1:blue) | Peeling efficiency of color 1 | Pressure requirement (easiness of the peeling of color 1) |
|---|---|---|---|
| Example 2 (present disclosure) | 5 | 3 | 7.5 |
| Example 3 (comparative example) | 4.5 | 4.5 | 7 |

As shown in Table 4, the written marks of the ink compositions according to the disclosure (examples 1 and 2) exhibit good results in terms of color intensity before peeling, in terms of easiness of peeling (low pressure needed) to rub of color 1, as well as in terms of efficiency of the erasing by peeling (the initial color of the written mark was efficiently removed). It is observed that the intensity of the second color (pink) after peeling of the first color (blue) is also vivid.

The written mark made, with the comparative ink composition of example 3 cannot be peeled efficiently, in particular when compared with the written mark made with the composition of example 1 according to the disclosure, which can be peeled efficiently and easily. In addition, the written mark made with the comparative composition of example 3 exhibits lower color intensity than the written mark made with the composition of example 1 of the disclosure.

The invention claimed is:

1. An ink composition comprising:
    (a) at least one film-forming elastomeric polymer,
    (b) at least one polyoxyethylene sorbitan ester,
    (c) at least one dye,
    (d) at least one pigment, and
    (e) water,
    wherein the at least one film-forming elastomeric polymer (a) includes hydrogenated acrylonitrile butadiene rubber (HNBR).

2. The ink composition according to claim 1, wherein the at least one polyoxyethylene sorbitan ester (b) is a polyoxyethylene sorbitan fatty acid ester.

3. The ink composition according to claim 1, wherein the at least one dye (c) is chosen in the group consisting of direct dyes, acid dyes, food dyes, Malachite green (C.I 4200) Victoria blue FB (C.I. 44045) methyl violet FN (C.I. 42535), rhodamine F4G (C.I. 45160), and rhodamine 6GCP (C.I 45160), and mixtures thereof.

4. The ink composition according to claim 3, wherein the at least one pigment (d) is provided as a pigment dispersion.

5. The ink composition according to claim 1, wherein the composition further comprises at least one plasticizer.

6. The ink composition according to claim 5, wherein the at least one plasticizer is chosen in the group consisting of alcohols, benzoate esters, diisobutyrate esters, and mixtures thereof.

7. The ink composition according to claim 5, wherein the at least one plasticizer is present in a content ranging from 1 to 25% by weight, relative to the total weight of the ink composition.

8. The ink composition according to claim 1, wherein the content of the at least one film-forming elastomeric polymer (a) represents at least 8% by weight, relative to the total weight of the ink composition.

9. The ink composition according to claim 1, wherein the content of the at least one polyoxyethylene sorbitan ester (b) ranges from 0.1 to 5% by weight, relative to the total weight of the ink composition.

10. The ink composition according to claim 1, wherein the total content of the at least one dye (c) ranges from 0.1 to 10% by weight, relative to the total weight of the ink composition.

11. The ink composition according to claim 4, wherein the content of the at least one pigment d) provided as a pigment dispersion ranges from 0.1 to 10% by weight, relative to the total weight of the ink composition.

12. The ink composition according to claim 1, wherein the content of water (e) ranges from 10 to 80% by weight, relative to the total weight of the ink composition.

13. The ink composition according to claim 1, wherein the composition further comprises at least one additive chosen in the group consisting of antimicrobial agents, antifungal agents, dispersing agents, wetting agents, pH regulators, and mixtures thereof.

14. The ink composition according to claim 1, wherein the ink composition is able to change its initial color to another color by peeling.

15. A method for preparing the ink composition according to claim 1, comprising the steps of:

(i) under stirring, adding the at least one dye (c) to the water (e), (ii) under stirring, adding the at least one film-forming elastomeric polymer (a) to the mixture obtained in step (i), (iii) under stirring, adding the at least one polyoxyethylene sorbitan ester (b), the at least one pigment (d), and optionally at least one plasticizer, to the mixture obtained in step (ii), and (iv) under stirring, adding optional additives to the mixture obtained in step (iii), wherein the additives are chosen in the group consisting of antimicrobial agents, antifungal agents, dispersing agents, wetting agents, pH regulators, and mixtures thereof.

16. A writing instrument containing the ink composition according to claim 1, wherein the writing instrument is a pen.

17. The writing instrument according to claim 16, wherein the writing instrument comprises an eraser.

18. A method for writing on a porous substrate, comprising the step of applying the ink composition according to claim 1 to a porous substrate.

19. The method according to claim 18, wherein the method further comprises changing the initial color (first color) of the writing into another color (second color) by peeling.

20. The ink composition according to claim 1, wherein the at least one film-forming elastomeric polymer (a) includes acrylonitrile butadiene rubber (NBR).

* * * * *